(12) United States Patent
Guay et al.

(10) Patent No.: US 12,725,289 B2
(45) Date of Patent: Sep. 1, 2026

(54) STABLE POSE ESTIMATION WITH ANALYSIS BY SYNTHESIS

(71) Applicants: DISNEY ENTERPRISES, INC., Burbank, CA (US); ETH Zürich (Eidgenössische Technische Hochschule Zürich), Zürich (CH)

(72) Inventors: Martin Guay, Zurich (CH); Dominik Tobias Borer, Zurich (CH); Jakob Joachim Buhmann, Zurich (CH)

(73) Assignees: Disney Enterprises, Inc., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 430 days.

(21) Appl. No.: 17/748,398

(22) Filed: May 19, 2022

(65) Prior Publication Data

US 2022/0392099 A1 Dec. 8, 2022

Related U.S. Application Data

(60) Provisional application No. 63/194,566, filed on May 28, 2021.

(51) Int. Cl.
*G06T 7/70* (2017.01)
*G06N 20/00* (2019.01)
(Continued)

(52) U.S. Cl.
CPC ............... *G06T 7/70* (2017.01); *G06N 20/00* (2019.01); *G06T 9/002* (2013.01); *G06V 10/774* (2022.01);
(Continued)

(58) Field of Classification Search
CPC . G06T 2207/20084; G06T 2207/30196; G06T 7/70; G06T 11/00; G06T 17/00;
(Continued)

(56) References Cited

U.S. PATENT DOCUMENTS

| | | | | |
|---|---|---|---|---|
| 10,679,046 | B1 * | 6/2020 | Black | G06V 40/23 |
| 2021/0064925 | A1 * | 3/2021 | Shih | G06N 3/084 |

(Continued)

OTHER PUBLICATIONS

Huang et al. “Invariant Representation Learning for Infant Pose Estimation with Small Data” Computer Vision and Pattern Recognition https://arxiv.org/abs/2010.06100v3 v3 Dec. 2, 2020 (Year: 2020).*

(Continued)

*Primary Examiner* — Ian L Lemieux
(74) *Attorney, Agent, or Firm* — Squire Patton Boggs LLP; Sarah Mirza

(57) ABSTRACT

One embodiment of the present invention sets forth a technique for generating a pose estimation model. The technique includes generating one or more trained components included in the pose estimation model based on a first set of training images and a first set of labeled poses associated with the first set of training images, wherein each labeled pose includes a first set of positions on a left side of an object and a second set of positions on a right side of the object. The technique also includes training the pose estimation model based on a set of reconstructions of a second set of training images, wherein the set of reconstructions is generated by the pose estimation model from a set of predicted poses outputted by the one or more trained components.

20 Claims, 6 Drawing Sheets
(3 of 6 Drawing Sheet(s) Filed in Color)

(51) Int. Cl.
*G06T 9/00* (2006.01)
*G06V 10/774* (2022.01)

(52) U.S. Cl.
CPC .............. *G06T 2207/20081* (2013.01); *G06T 2207/20084* (2013.01); *G06T 2207/30196* (2013.01)

(58) Field of Classification Search
CPC . G06T 2207/20016; G06T 2207/20081; G06T 7/251; G06T 7/75; G06T 9/002; G06T 19/006; G06T 2200/08; G06T 2207/30244; G06T 7/50; G06T 7/73; G06T 7/80; G06N 3/045; G06N 3/084; G06N 3/088; G06N 3/04; G06N 3/0464; G06N 3/09; G06N 20/00; G06N 3/0475; G06N 3/094; G06V 10/25; G06V 10/40; G06V 10/454; G06V 10/82; G06V 20/20; G06V 40/11; G06V 40/28
See application file for complete search history.

(56) References Cited

U.S. PATENT DOCUMENTS

2022/0188559 A1* 6/2022 Baek .......................... G06T 7/73
2022/0301304 A1* 9/2022 Hampali ................... G06T 7/73
2023/0298204 A1* 9/2023 Wang ...................... G06T 19/20 345/419
2023/0386072 A1* 11/2023 Yao ......................... G06T 7/251
2024/0193809 A1* 6/2024 Ostadabbas .......... G06V 40/103

OTHER PUBLICATIONS

Sun, X., Xiao, B., Wei, F., Liang, S., & Wei, Y. (2018). Integral human pose regression. In Proceedings of the European conference on computer vision (ECCV) (pp. 529-545). (Year: 2018).*

Ma, L., Jia, X., Sun, Q., Schiele, B., Tuytelaars, T., & Van Gool, L. (2017). Pose guided person image generation. Advances in neural information processing systems, 30. (Year: 2017).*

Pavlakos, Georgios, et al. "Expressive body capture: 3d hands, face, and body from a single image." Proceedings of the IEEE/CVF conference on computer vision and pattern recognition. 2019. (Year: 2019).*

Tripathi, S., Chandra, S., Agrawal, A., Tyagi, A., Rehg, J. M., & Chari, V. (2019). Learning to generate synthetic data via compositing. In Proceedings of the IEEE/CVF Conference on Computer Vision and Pattern Recognition (pp. 461-470). (Year: 2019).*

Hoffmann, D. T., Tzionas, D., Black, M. J., & Tang, S. (Sep. 2019). Learning to train with synthetic humans. In German conference on pattern recognition (pp. 609-623). Cham: Springer International Publishing. (Year: 2019).*

Aberman et al., "Deep Video-Based Performance Cloning", Eurographics 2019, DOI: 10.1111/cgf.13632, vol. 38, No. 2, 2019, pp. 219-233.

Andriluka et al., "2D Human Pose Estimation: New Benchmark and State of the Art Analysis", In 2014 IEEE Conference on Computer Vision and Pattern Recognition, 2014, 8 pages.

Bala et al., "Automated markerless pose estimation in freely moving macaques with OpenMonkeyStudio", https://doi.org/10.1038/s41467-020-18441-5, Nature Communications, vol. 11, No. 1, Dec. 2020, 12 pages.

Borer et al., "Augmenting Cats and Dogs: Procedural Texturing for Generalized Pet Tracking", DOI: 10.520/0010333/70122032, In Proceedings of the 16th International Joint Conference on Computer Vision, Imaging and Computer Graphics Theory and Applications, vol. 1, 2021, pp. 122-132.

Borer et al., "Rig-Space Neural Rendering: Compressing the Rendering of Characters for Previs, Real-Time Animation And High-Quality Asset Re-Use", In Proceedings of the 16th International Joint Conference on Computer Vision, Imaging and Computer Graphics Theory and Applications, vol. 1, 2021, pp. 300-307.

Cao et al., "OpenPose: Realtime Multi-Person 2D Pose Estimation using Part Affinity Fields", arXiv:1812.08008, 2018, pp. 7291-7299.

Ionescu et al., "Latent Structured Models for Human Pose Estimation", IEEE International Conference on Computer Vision (ICCV), Nov. 2011, 8 pages.

Chan et al., "Everybody Dance Now", In 2019 IEEE/CVF International Conference on Computer Vision (ICCV), 2019, pp. 5932-5941.

Chen et al., "Unsupervised 3D Pose Estimation with Geometric Self-Supervision", In 2019 IEEE/CVF Conference on Computer Vision and Pattern Recognition (CVPR), 2019, pp. 5707-5717.

Cmu, "Cmu Motion Capture Database", Retrieved from http://mocap.cs.cmu.edu/, 2001, 2 pages.

Dosovitskiy et al., "Generating Images with Perceptual Similarity Metrics based on Deep Networks", Advances in Neural Information Processing Systems, vol. 29, Curran Associates, 2016, 9 pages.

Goodfellow et al., "Generative Adversarial Nets", In Proceedings of the 27th International Conference on Neural Information Processing Systems, vol. 2, 2014, 9 pages.

Habermann et al., "DeepCap: Monocular Human Performance Capture Using Weak Supervision", DOI:10.1109/CVPR42600.2020.00510, In IEEE Conference on Computer Vision and Pattern Recognition (CVPR), Jun. 2020, pp. 5051-5062.

Ionescu et al., "Human3.6M: Large Scale Datasets and Predictive Methods for 3D Human Sensing in Natural Environments", IEEE Transactions on Pattern Analysis and Machine Intelligence, vol. 36, No. 7, Jul. 2014, pp. 1325-1339.

Isola et al., "Image-to-Image Translation with Conditional Adversarial Networks", DOI 10.1109/CVPR.2017.632, In 2017 IEEE Conference on Computer Vision and Pattern Recognition (CVPR), 2017, pp. 5967-5976.

Jakab et al., "Unsupervised Learning of Object Landmarks Through Conditional Image Generation", In Advances in Neural Information Processing Systems, vol. 31, 2018, 12 pages.

Jakab et al., "Self-Supervised Learning of Interpretable Keypoints from Unlabelled Videos", In Proceedings of the IEEE/CVF Conference on Computer Vision and Pattern Recognition (CVPR), Jun. 2020, pp. 8784-8794.

Kanazawa et al., "End-to-End Recovery of Human Shape and Pose", In Computer Vision and Pattern Recognition (CVPR), DOI 10.1109/CVPR.2018.00744, 2018, pp. 7122-7131.

Kanazawa et al., "WarpNet: Weakly Supervised Matching for Singleview Reconstruction", DOI 10.1109/CVPR.2016.354, In 2016 IEEE Conference on Computer Vision and Pattern Recognition (CVPR), 2016, pp. 3253-3261.

Kundu et al., "Self-Supervised 3D Human Pose Estimation via Part Guided Novel Image Synthesis", DOI 10.1109/CVPR.44600.2020.00619, In 2020 IEEE/CVF Conference on Computer Vision and Pattern Recognition, 2020, pp. 6151-6161.

Lin et al., "Microsoft COCO: Common Objects in Context", In ECCV, 2014, 16 pages.

Loper et al., "SMPL: A Skinned Multi-Person Linear Model", ACM Transactions on Graphics, vol. 34, No. 6, Article 248, DOI: http://doi.acm.org/10.1145/2816795.2818013, Nov. 2015, pp. 248:1-248:16.

Lorenz et al., "Unsupervised Part-Based Disentangling of Object Shape and Appearance", In 2019 IEEE/CVF Conference on Computer Vision and Pattern Recognition (CVPR), 2019, pp. 10947-10956.

Mao et al., "Least Squares Generative Adversarial Networks", DOI 10.1109/ICCV.2017.304, In Proceedings of the IEEE International Conference on Computer Vision (ICCV), Oct. 2017, pp. 2813-2821.

Martinez et al., "A Simple yet Effective Baseline for 3d Human Pose Estimation", DOI 10.1109/ICCV.2017.288, IEEE International Conference on Computer Vision (ICCV), 2017, pp. 2659-2668.

Newell et al., "Stacked Hourglass Networks for Human Pose Estimation", In ECCV, 2016, 17 pages.

Park et al., "Semantic Image Synthesis with Spatially-Adaptive Normalization", DOI 10.1109/CVPR.2019.00244, In Proceedings of the IEEE Conference on Computer Vision and Pattern Recognition, 2019, pp. 2332-2341.

(56) References Cited

OTHER PUBLICATIONS

Pavlakos et al., "Learning To Estimate 3D Human Pose and Shape from a Single Color Image", DOI 10.1109/CVPR.2018.00055, In 2018 IEEE/CVF Conference on Computer Vision and Pattern Recognition, 2018, pp. 459-468.
Rhodin et al., "Unsupervised Geometry-Aware Representation for 3D Human Pose Estimation", In Computer Vision, ECCV, Apr. 3, 2018, 17 pages.
Sarkar et al., "HumanGAN: A Generative Model of Humans Images", abs/2103.06902, Mar. 11, 2021, 21 pages.
Schmidtke et al., "Unsupervised Human Pose Estimation Through Transforming Shape Templates", DOI 10.1109/CVPR46437.2021, In Proceedings of the IEEE/CVF Conference on Computer Vision and Pattern Recognition, Jun. 2021, pp. 2484-2494.
Simonyan et al., "Very Deep Convolutional Networks for Large-Scale Image Recognition", In International Conference on Learning Representations, 2015, 14 pages.
Thewlis et al., "Unsupervised Learning of Object Landmarks by Factorized Spatial Embeddings", DOI 10.1109/ICCV.2017.348, In Proceedings of the IEEE International Conference on Computer Vision (ICCV), Oct. 2017, pp. 3229-3238.
Tobin et al., "Domain Randomization for Transferring Deep Neural Networks from Simulation to the Real World", 2017 IEEE/RSJ International Conference on Intelligent Robots and Systems (IROS), Sep. 24-28, 2017, pp. 23-30.
Toshev et al., "DeepPose: Human Pose Estimation via Deep Neural Networks", In 2014 IEEE Conference on Computer Vision and Pattern Recognition (CVPR), 2014, pp. 1653-1660.
Varol et al., "Learning from Synthetic Humans", 2017 IEEE Conference on Computer Vision and Pattern Recognition (CVPR), Jul. 2017, pp. 4627-4635.
Villegas et al., "Learning to Generate Long-term Future via Hierarchical Prediction", In Proceedings of the 34th International Conference on Machine Learning, vol. 70, ICML, 2017, pp. 3560-3569.
Wang et al., "High-Resolution Image Synthesis and Semantic Manipulation with Conditional GANs", In 2018 IEEE/CVF Conference on Computer Vision and Pattern Recognition, 2018, pp. 8798-8807.
Wei et al., "Convolutional Pose Machines", In Proceedings of the IEEE Conference on Computer Vision and Pattern Recognition (CVPR), Jun. 2016, pp. 4724-4732.
Yang et al., "3D Human Pose Estimation in the Wild by Adversarial Learning", In 2018 IEEE/CVF Conference on Computer Vision and Pattern Recognition (CVPR), 2018, pp. 5255-5264.
Zhang et al., "Unsupervised Discovery of Object Landmarks as Structural Representations", In IEEE Conference on Computer Vision and Pattern Recognition (CVPR), Jun. 2018, pp. 2694-2703.
Zhu et al., "Unpaired Image-To-Image Translation using Cycle-Consistent Adversarial Networks", In Computer Vision (ICCV), 2017 IEEE International Conference on Computer Vision, 2017, pp. 2242-2251.
Zuffi et al., "Three-D Safari: Learning to Estimate Zebra Pose, Shape, and Texture from Images "in the wild"", In International Conference on Computer Vision, Oct. 2019, pp. 5358-5367.
Zuffi et al., "3D Menagerie: Modeling the 3D Shape and Pose of Animals", In 2017 IEEE Conference on Computer Vision and Pattern Recognition (CVPR), 2017, pp. 5524-5532.

* cited by examiner

STABLE POSE ESTIMATION WITH ANALYSIS BY SYNTHESIS

CROSS-REFERENCE TO RELATED APPLICATIONS

This application claims benefit of U.S. Provisional patent application titled "UNSUPERVISED TRAINING OF A POSE ESTIMATION SYSTEM USING SYNTHETIC DATA," filed May 28, 2021, and having Ser. No. 63/194,566. The subject matter of this related application is hereby incorporated herein by reference.

BACKGROUND

Field of the Various Embodiments

Embodiments of the present disclosure relate generally to machine learning and pose estimation and, more specifically, to stable pose estimation with analysis by synthesis.

Description of the Related Art

Pose estimation techniques are commonly used to detect and track humans, animals, robots, mechanical assemblies, and other articulated objects that can be represented by rigid parts connected by joints. For example, a pose estimation technique could be used to determine and track two-dimensional (2D) and/or three-dimensional (3D) locations of wrist, elbow, shoulder, hip, knee, ankle, head, and/or other joints of a person in an image or a video.

Recently, machine learning models have been developed to perform pose estimation. These machine learning models typically include deep neural networks with a large number of tunable parameters and thus require a large amount and variety of data to train. However, collecting training data for these machine learning models can be time- and resource-intensive. Continuing with the above example, a deep neural network could be trained to estimate the 2D or 3D locations of various joints for a person in an image or a video. To adequately train the deep neural network for the pose estimation task, the training dataset for the deep neural network would need to capture as many variations as possible on human appearances, human poses, and environments in which humans appear. Each training sample in the training dataset would also need to be manually labeled with the 2D or 3D locations of human joints in one or more images.

This difficulty and cost in generating a large and diverse training dataset for pose estimation can interfere with the performance of machine learning models that are trained to perform pose estimation. Continuing with the above example, the training dataset could lack images of certain human appearances, human poses, and/or environments in which humans appear. The training dataset could also, or instead, include a relative small number of manually labeled training samples. Consequently, the training dataset could adversely affect the ability of the deep neural network to generalize to new data and/or accurately predict the positions of human joints in images.

As the foregoing illustrates, what is needed in the art are more effective techniques for performing pose estimation using machine learning models.

SUMMARY

One embodiment of the present invention sets forth a technique for generating a pose estimation model. The technique includes generating one or more trained components included in the pose estimation model based on a first set of training images and a first set of labeled poses associated with the first set of training images, wherein each labeled pose included in the first set of labeled poses includes a first set of positions on a left side of an object and a second set of positions on a right side of the object. The technique also includes training the pose estimation model based on a set of reconstructions of a second set of training images, wherein the set of reconstructions is generated by the pose estimation model from a set of predicted poses outputted by the one or more trained components.

One technical advantage of the disclosed techniques relative to the prior art is that components of the pose estimation model can be pretrained to perform a pose estimation task using synthetic data. Accordingly, with the disclosed techniques, a sufficiently large and diverse training dataset of images and labeled poses can be generated more efficiently than a conventional training dataset for pose estimation that includes manually selected images and manually labeled poses. Another technical advantage of the disclosed techniques is that the pretrained components of the machine learning model are further trained using unlabeled "real world" images. The machine learning model is thus able to generalize to new data and/or predict poses more accurately than conventional machine learning models that are trained using only synthetic data or a smaller amount of manually labeled data. These technical advantages provide one or more technological improvements over prior art approaches.

BRIEF DESCRIPTION OF THE DRAWINGS

The patent or application file contains at least one drawing executed in color. Copies of this patent or patent application publication with color drawing(s) will be provided by the Office upon request and payment of the necessary fee. So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
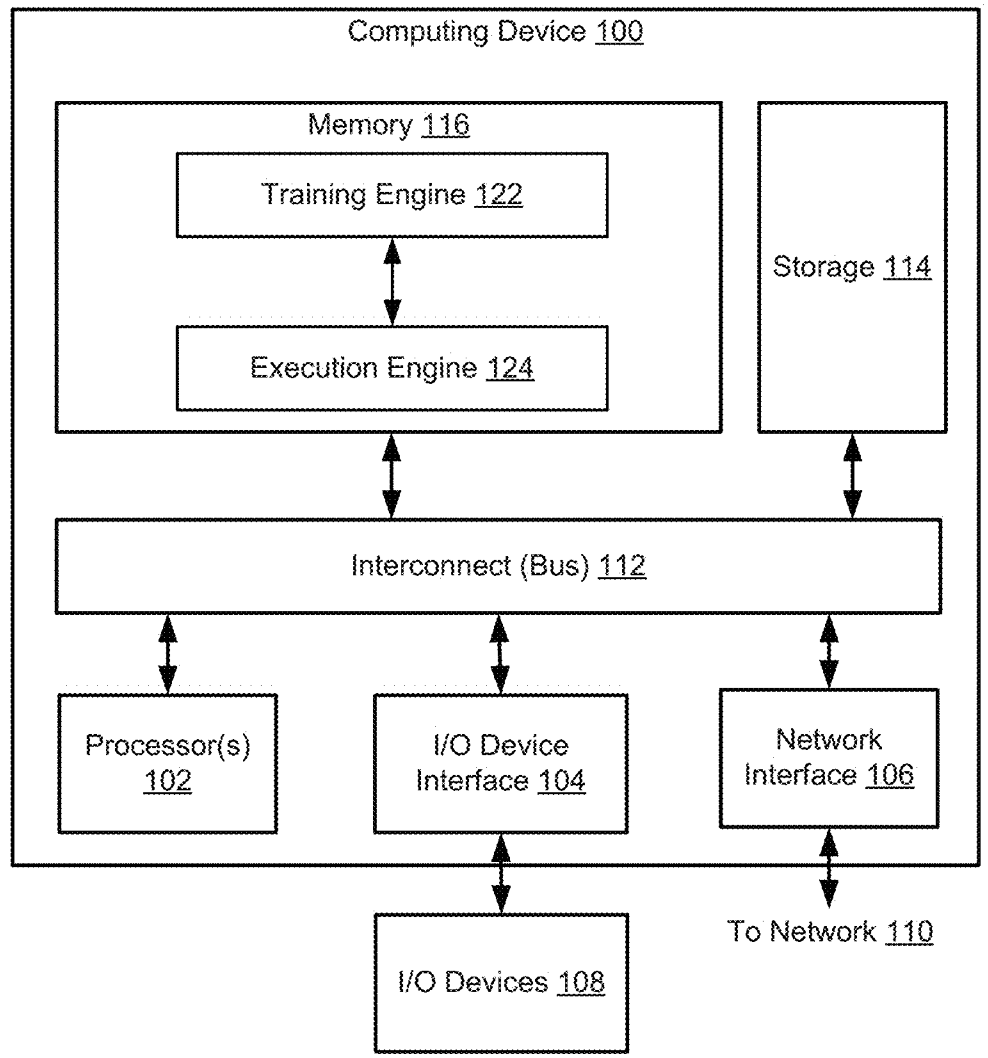
FIG. 1 illustrates a computing device configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and an execution engine 124 that reside in a memory 116.

It is noted that the computing device described herein is illustrative and that any other technically feasible configurations fall within the scope of the present disclosure. For example, multiple instances of training engine 122 and execution engine 124 could execute on a set of nodes in a distributed system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In some embodiments, training engine 122 trains a machine learning model to estimate poses of objects in images. As described in further detail below, the machine learning model is initially pretrained in a supervised fashion using synthetic images of objects that are labeled with poses of the objects. The machine learning model is then trained in an unsupervised fashion using "real-world" unlabeled images of objects.

Execution engine 124 executes one or more portions of the trained machine learning model to predict poses for objects in additional images. Because the machine learning model is pretrained to predict labeled poses in synthetic data and subsequently retrained using real-world data, the machine learning model is able to generalize to new data and/or predict poses more accurately than conventional machine learning models that are trained using only synthetic data or a smaller amount of manually labeled real-world data.

Stable Pose Estimation with Analysis by Synthesis

Figure 2:
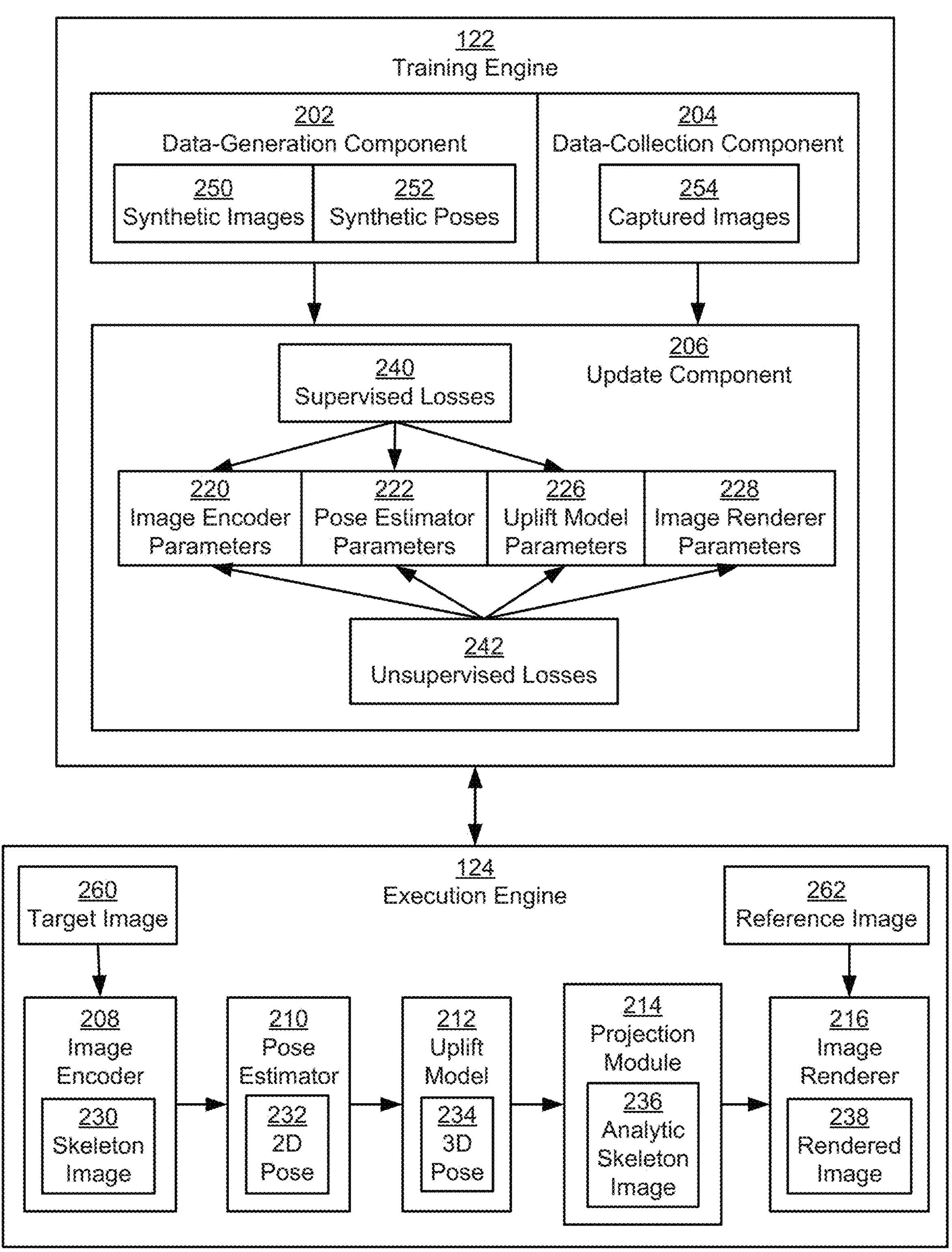
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. As mentioned above, training engine 122 and execution engine 124 operate to train and execute a machine learning model in a pose estimation task. For example, training engine 122 and execution engine 124 could use the machine learning model to predict two-dimensional (2D) and/or three-dimensional (3D) positions of joints in humans, animals, and/or other types of articulated objects in various images. The machine learning model includes an image encoder 208, a pose estimator 210, an uplift model 212, a projection module 214, and an image renderer 216. Each of these components is described in further detail below.

Image encoder 208 includes a convolutional neural network (CNN), deep neural network (DNN), image-to-image translation network, and/or another type of machine learning model that generates a skeleton image 230 from a target image 260. In some embodiments, skeleton image 230 includes an image-based representation of a pose as a skeleton for an articulated object in target image 260. For example, skeleton image 230 could include a head, torso, limbs, and/or other parts of a human in target image 260.

In one or more embodiments, skeleton image 230 includes a multi-channel image, where each channel stores a different set of pixel values for a set of pixel locations in target image 260. A given channel stores pixel values that indicate pixel locations of a certain limb, joint, or another part of the articulated object. For example, pixel values in each channel could range from 0 to 1 and represent the probabilities that a certain part of the articulated object is found in the corresponding pixel locations.

Figure 3A:
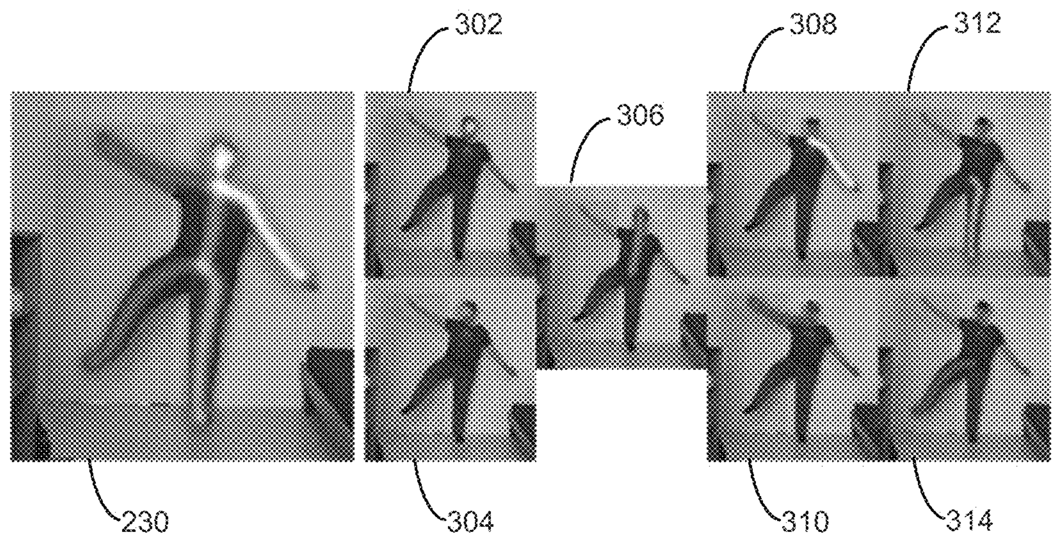
FIG. 3A illustrates an exemplar skeleton image, according to various embodiments.

FIG. 3A illustrates an exemplar skeleton image 230, according to various embodiments. More specifically, FIG. 3A illustrates a multi-channel skeleton image 230 of a person and individual channels 302, 304, 306, 308, 310, 312, and 314 within the multi-channel skeleton image 230.

As shown in FIG. 3A, skeleton image 230 includes an image-based representation of the pose of a person. For example, skeleton image 230 could include a graphical representation of the pose of the person in a corresponding target image 260. Within skeleton image 230, the pose is visualized using various color-coded parts of a skeleton for the person. Skeleton image 230 is additionally formed by compositing, concatenating, stacking, or otherwise combining multiple channels 302, 304, 306, 308, 310, 312, and 314, where each channel stores pixel values related to a different body part in the skeleton. In particular, skeleton image 230 includes a first channel 302 that stores pixel values related to a left side of a head, a second channel 304 that stores pixel values related to a right side of a head, a third channel 306 that stores pixel values related to a torso, a fourth channel 308 that stores pixel values related to a left arm, a fifth channel 310 that stores pixels values related to a right arm, a sixth channel 312 that stores pixel values related to a left leg, and a seventh channel 314 that stores pixel values related to a right leg.

In one or more embodiments, pixel values in channels 302, 304, 306, 308, 310, 312, and 314 indicate predicted locations of corresponding parts of the skeleton. For example, each pixel value in a given channel 302, 304, 306, 308, 310, 312, and 314 could store a value ranging from 0 to 1 that represents the "probability" that a limb is located at the corresponding pixel location.

In another example, each pixel value in channels 302, 304, 306, 308, 310, 312, and 314 could be computed using the following:

$$y = \exp\left(-\gamma \min_{\substack{(i,j)\in E \\ t\in[0,1]}} \|u - ((1-t)\cdot p_i + t\cdot p_j)\|^2\right) \quad (1)$$

In the above equation, $y \in \mathbb{R}^{C\times W\times H}$ represents a multi-channel skeleton image 230, where C is the number of channels, is the width of skeleton image 230, and H is the height of skeleton image 230. E is the set of connected keypoint pairs (i,j) that denote limbs in a skeleton (i.e., pairs of keypoints representing pairs of joints that are connected to form limbs in the skeleton). p is a keypoint position (e.g., a 2D pixel coordinate of the keypoint within target image 260), u is a pixel location (e.g., pixel coordinate) in skeleton image 230, and $\gamma$ is a predefined scaling factor. Consequently, Equation 1 can be used to compute pixel values in each channel 302, 304, 306, 308, 310, 312, and 314 that represent the "distance" from the corresponding pixel locations u to the closest limbs in the skeleton.

In some embodiments, skeleton image 230 includes channels 302, 304, 306, 308, 310, 312, and/or 314 that separate the joints of the skeleton into distinct limbs (e.g., arms, legs, etc.) on left and right sides of the body. This representation of skeleton image 230 disambiguates between a person that is facing forward in an image and a person that is facing backward in an image. In contrast, conventional single-channel skeleton images do not distinguish between left and right sides of a body and can therefore result in predicted poses that are "flipped" (e.g., a predicted pose that indicates a right side of an object where the left side of the object is located and a left side of the object where the right side of the object is located).

While skeleton image 230 is depicted using seven channels 302, 304, 306, 308, 310, 312, and 314, it will be appreciated that the number and types of channels in skeleton image 230 can be selected or varied to accommodate different types of articulated objects, representations of poses, and/or pose granularities. For example, skeleton image 230 could include one or more channels that store pixel values related to one or more joints in a neck or tail of an animal. In another example, skeleton image 230 could include a different channel for each major portion of a limb (e.g., upper right arm, lower right arm, upper left arm, lower left arm, upper right leg, lower right leg, upper left leg, lower left leg, etc.) in a person instead of a channel for each limb. In a third example, skeleton image 230 could include C channels that depict the locations of C joints, limbs, and/or other parts of a robot.

Returning to the discussion of FIG. 2, skeleton image 230 produced by image encoder 208 from target image 260 is inputted into pose estimator 210, and a 2D pose 232 of the articulated object in target image 260 is received as output from pose estimator 210. For example, pose estimator 210 could include a CNN, DNN, image-to-image translation network, and/or another type of machine learning model that generates 2D pose 232 as a set of 2D coordinates or pixel locations of joints in a body, given a depiction of limbs in the body within a multi-channel skeleton image 230.

2D pose 232 is inputted into uplift model 212, and a 3D pose 234 for the articulated object in target image 260 is received as output from uplift model 212. For example, uplift model 212 could include a CNN, DNN, and/or another type of machine learning model that converts 2D coordinates or pixel locations of joints in 2D pose 232 into 3D pose 234 that includes 3D coordinates of the same joints.

Consequently, skeleton image 230, 2D pose 232, and 3D pose 234 correspond to different representations of the pose of the articulated object in target image 260. As described in further detail below, these representations disentangle the pose of the articulated object in target image 260 from the appearance of the articulated object in target image 260. These representations can additionally be used to adapt individual components of the machine learning model (e.g., image encoder 208, pose estimator 210, uplift model 212, image renderer 216) to specialized tasks, thereby improving the overall pose estimation performance of the machine learning model.

Projection module 214 performs a mathematical projection of 3D pose 234 into an analytic skeleton image 236 in the same image space as target image 260. For example, projection module 214 could use a perspective camera with camera parameters that are fixed to plausible defaults (e.g., a field of view of 62°) to project 3D coordinates in 3D pose 234 onto pixel locations in analytic skeleton image 236. As with skeleton image 230 outputted by image encoder 208 from target image 260, analytic skeleton image 236 can include a multi-channel image. As discussed above, each channel in the multi-channel image corresponds to a different part (e.g., limb) of the articulated object and stores a different set of pixel values for a set of pixel locations in target image 260. Further, pixel values in each channel represent the probabilities that the corresponding pixel locations in target image 260 include the corresponding part of the articulated object.

Analytic skeleton image 236 and a reference image 262 are inputted into image renderer 216. In some embodiments, reference image 262 includes the same articulated object as target image 260. For example, target image 260 and reference image 262 could include two different frames from the same video of a person. As a result, target image 260 and reference image 262 could depict the person in different poses against the same background and/or in the same environment.

In one or more embodiments, image renderer 216 uses analytic skeleton image 236 and reference image 262 to generate a rendered image 238 that matches target image 260. For example, image renderer 216 could include a CNN, DNN, image-to-image translation network, and/or another type of machine learning model that attempts to reconstruct target image 260 in the form of rendered image 238 based on analytic skeleton image 236 that depicts the pose of an articulated object in target image 260 and reference image 262 that captures the appearance of the articulated object in the same environment as in target image 260 but in a pose that differs from that in target image 260.

Training engine 122 trains image encoder 208, pose estimator 210, uplift model 212, and image renderer 216 to adapt each component to a corresponding task. A data-generation component 202 and a data-collection component 204 in training engine 122 produce training data for the components, and an update component 206 in training engine 122 uses the training data to update parameters of image encoder 208, pose estimator 210, uplift model 212, and image renderer 216.

More specifically, training engine 122 performs training of image encoder 208, pose estimator 210, uplift model 212, and/or image renderer 216 in two stages. In a first pretraining stage, update component 206 performs supervised training that individually updates image encoder parameters 220 of image encoder 208, pose estimator parameters 222 of pose estimator 210, and uplift model parameters 226 of uplift model 212 based on one or more supervised losses 240. During the first pretraining stage, update component 206 can also update image renderer parameters 228 of image renderer 216 based on one or more unsupervised losses 242.

In a second training stage, update component 206 performs unsupervised training that updates image encoder parameters 220 of image encoder 208, pose estimator parameters 222 of pose estimator 210, uplift model parameters 226 of uplift model 212, and image renderer parameters 228 of image renderer 216 based on one or more unsupervised losses 242. During the second training stage, update component 206 also performs supervised training of image encoder parameters 220, pose estimator parameters 222, and/or uplift model parameters 226 using supervised losses 240. For example, update component 206 could alternate between unsupervised training of image encoder parameters 220, pose estimator parameters 222, uplift model parameters 226, and image renderer parameters 228 and supervised training of image encoder parameters 220, pose estimator parameters 222, and/or uplift model parameters 226 during the second training stage.

In one or more embodiments, update component 206 performs the initial pretraining stage using synthetic images 250 and synthetic poses 252 from data-generation component 202. For example, data-generation component 202 could use computer vision and/or computer graphics techniques to render synthetic images 250 of humans, animals, and/or other articulated objects. Within synthetic images 250, the backgrounds, poses, shapes, and appearances of the articulated objects could be randomized and/or otherwise varied. Data augmentation techniques could also be used to randomize limb lengths, object sizes, and object locations within synthetic images 250. The same computer vision and/or computer graphics techniques could also be used to generate synthetic poses 252 that include ground truth labels for skeleton image 230, 2D pose 232, and 3D pose 234 for articulated objects in each of synthetic images 250.

Update component 206 also, or instead, performs the initial pretraining stage using non-rendered (e.g., captured) images of articulated objects and the corresponding ground truth poses. These ground truth poses can be generated via manual labeling techniques, motion capture techniques, and/or other techniques for determining skeleton image 230, 2D pose 232, and 3D pose 234 for an articulated object in an image.

In the second training stage, update component 206 performs unsupervised training of image encoder 208, pose estimator 210, uplift model 212, and/or image renderer 216 using captured images 254 from data-collection component 204. In some embodiments, captured images 254 include "real-world" images of the same types of articulated objects as those depicted in synthetic images 250. For example, captured images 254 could include images of humans, animals, and/or other articulated objects in a variety of poses, shapes, appearances, and/or backgrounds.

Captured images 254 additionally include pairs of images of the same articulated object in the same environment. For example, each pair of captured images 254 could include a given target image 260 of an articulated object against a background and a corresponding reference image 262 of the same articulated object in a different pose against the same background. As mentioned above, each target image 260 and corresponding reference image 262 can be obtained as two separate frames from the same video. Each target image 260 and corresponding reference image 262 can also, or instead, be obtained as two separate still images of the same subject against the same background.

Figure 3B:
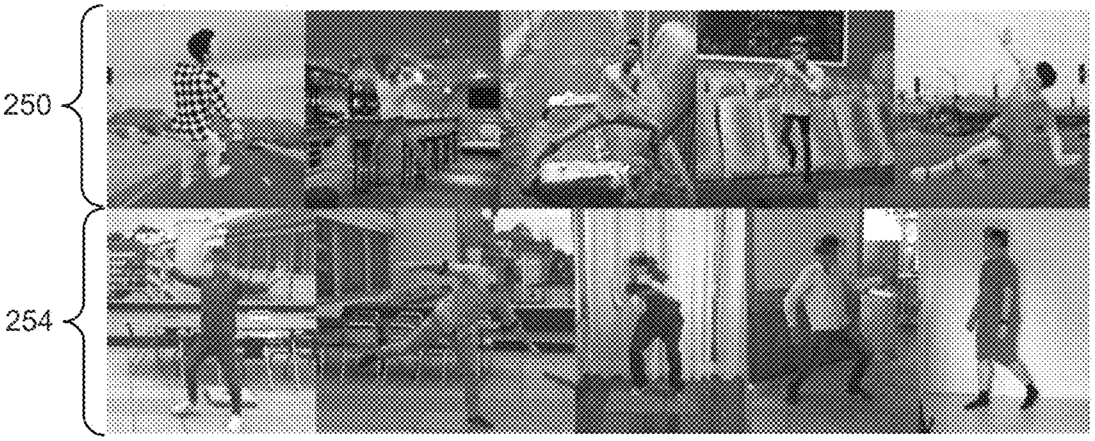
FIG. 3B illustrates an exemplar set of synthetic images and an exemplar set of captured images, according to various embodiments.

FIG. 3B illustrates an exemplar set of synthetic images 250 and an exemplar set of captured images 254, according to various embodiments. As shown in FIG. 3B, exemplar synthetic images 250 include renderings of synthetic humans (or other types of articulated objects) that vary in appearance, clothing, shape, proportion, and pose against a variety of backgrounds. For example, data-generation component 202 could render 3D assets representing synthetic humans using a variety of randomly sampled meshes, blendshapes, poses, textures, camera parameters, lighting, and/or occlusions. Data-generation component 202 could also overlay the rendered 3D assets onto randomized backgrounds to construct synthetic images 250. Data-generation component 202 could further augment synthetic images 250 by applying randomized values of brightness, hue, saturation, blur, pixel noise, translation, rotation, scaling, and mirroring to synthetic images 250.

Data-generation component 202 additionally generates synthetic poses 252 (not shown in FIG. 3B) for synthetic humans (or other types of articulated objects) in synthetic images 250. For example, data-generation component 202 could determine a synthetic ground truth skeleton image, 2D pose, and 3D pose for a given synthetic image using a 3D mesh for an articulated object in the synthetic image and camera parameters used to render the articulated object in the synthetic image.

Captured images 254 include images of humans that are captured by cameras. Like synthetic images 250, captured images 254 also include varying appearances, poses, shapes, and backgrounds. For example, captured images 254 could be generated of humans performing different actions in different environments.

Figure 4:
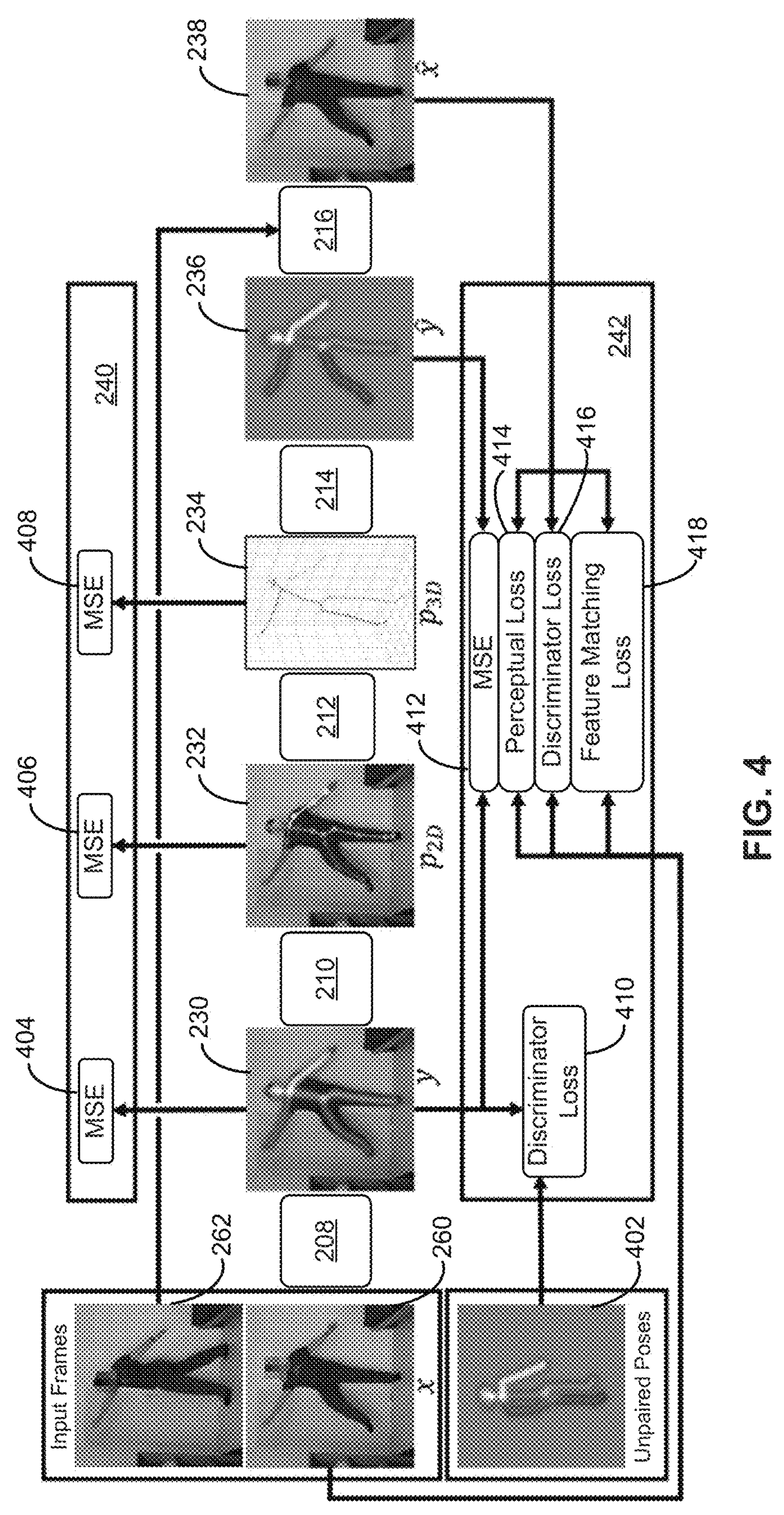
FIG. 4 illustrates the operation of the training engine of FIG. 1, according to various embodiments.

FIG. 4 illustrates the operation of training engine 122 of FIG. 1, according to various embodiments. As mentioned above, training engine 122 trains image encoder 208, pose estimator 210, uplift model 212, image renderer 216, and/or other components of a machine learning model to perform one or more tasks related to pose estimation.

During training of the machine learning model, training engine 122 performs a forward pass that applies one or more components to input data to generate corresponding outputs. During this forward pass, training engine 122 inputs target image 260 (denoted by x in FIG. 4) into image encoder 208 and receives skeleton image 230 (denoted by y in FIG. 4) as output from image encoder 208. Training engine 122 also, or instead, inputs skeleton image 230 into pose estimator 210 and receives 2D pose 232 (denoted by $p_{2D}$ in FIG. 4) as output of pose estimator 210. Training engine 122 also, or instead, inputs 2D pose 232 into uplift model 212 and receives 3D pose 234 (denoted by $p_{3D}$ in FIG. 4) as output of uplift model 212. Training engine 122 also, or instead, inputs 3D pose 234 into projection module 214 and receives analytic skeleton image 236 (denoted by $\hat{y}$ in FIG. 4) as output of projection module 214. Training engine 122 also, or instead, inputs analytic skeleton image 236 and reference image 262 into image renderer 216 and receives rendered image 238 (denoted by $\hat{x}$ in FIG. 4) as output of image renderer 216.

After a forward pass is performed, training engine 122 performs a backward pass that updates parameters of the component(s) of the machine learning model based on one or more losses calculated using the output of the component (s). These losses can include supervised losses 240 between the outputs of image encoder 208, pose estimator 210, and uplift model 212 and the corresponding ground truth labels. More specifically, supervised losses 240 include a mean squared error (MSE) 404 between skeleton image 230 outputted by image encoder 208 from a given target image 260 in synthetic images 250 and a corresponding ground truth skeleton image included in synthetic poses 252. Supervised losses 240 also include an MSE 406 between 2D pose 232 and a corresponding 2D ground truth pose included in synthetic poses 252. Supervised losses 240 further include an MSE 408 between 3D pose 234 and a corresponding 3D ground truth pose included in synthetic poses 252.

Losses computed during a given backward pass can also include a number of unsupervised losses 242 that do not involve ground truth labels. As shown in FIG. 4, unsupervised losses 242 include a discriminator loss 410 associated with skeleton image 230 and an MSE 412 associated with skeleton image 230 and analytic skeleton image 236. Unsupervised losses 242 also include a perceptual loss 414, a discriminator loss 416, and a feature matching loss 418 associated with target image 260 and rendered image 238.

Discriminator loss 410 is used with a dataset of unpaired poses 402 (i.e., poses 402 that lack corresponding labels or "targets" to be predicted) and output of image encoder 208 to train a first discriminator neural network. In some embodiments, the first discriminator neural network is trained to discriminate between "real" skeleton images generated from unpaired poses 402 of real-world articulated objects (e.g., skeleton images generated from motion capture data of the real-world articulated objects) and "fake" skeleton images that are not generated from real-world articulated objects (e.g., skeleton images that are not generated from motion capture data or other representations of poses of real-world articulated objects). For example, the first discriminator neural network could be trained using the following discriminator loss 410:

$$L_{disc\_sk}=\Sigma D_{sk}(y_{real})^2+\Sigma(1-D_{sk}(y_{fake}))^2 \quad (2)$$

In the above equation, $L_{disc\_sk}$ represents discriminator loss 410, $D_{sk}$ represents a multi-scale discriminator for skeleton images, $y_{real}$ represents skeleton images generated from "real" unpaired poses 402, and $y_{fake}$ represents fake skeleton images that are not generated from unpaired poses 402 (e.g., skeleton images outputted by image encoder 208 as estimates of poses in the corresponding target images). Within discriminator loss 410, $D_{sk}(y_{real})$ represents the probability that the discriminator accurately predicts a real skeleton image, and $D_{sk}(y_{fake})$ represents the probability that the discriminator inaccurately predicts that a fake skeleton image is a real skeleton image. Discriminator loss 410 thus corresponds to a least squares loss that seeks to maximize the probability that the discriminator correctly identifies real skeleton images labeled with 1 and minimize the probability that the discriminator incorrectly identifies fake skeleton images labeled with 0. Further, discriminator loss 410 allows the first discriminator to learn a prior distribution of realistic poses and encourages image encoder 208 to generate skeleton images that represent plausible poses.

In one or more embodiments, the first discriminator neural network is trained in an adversarial fashion with image encoder 208. More specifically, training engine 122 can train image encoder 208 and the first discriminator neural network in a way that minimizes MSE 404 and maximizes discriminator loss 410. For example, training engine 122 could initially train image encoder 208 to minimize MSE 404 between each skeleton image 230 outputted by image encoder 208 from a synthetic image and the corresponding ground truth skeleton image 230 for the synthetic image. Next, training engine 122 could train the first discriminator neural network in a way that maximizes discriminator loss 410 as calculated using real skeleton images from unpaired poses 402 and fake skeleton images outputted by the trained image encoder 208. Training engine 122 could then train both image encoder 208 and the first discriminator neural network in a way that minimizes discriminator loss 410 for image encoder 208 and maximizes discriminator loss 410 for the first discriminator neural network.

MSE 412 is computed between skeleton image 230 generated by image encoder 208 from target image 260 and a downstream analytic skeleton image 236 generated by projection module 214. MSE 412 ensures that analytic skeleton image 236, as generated from a projection of 3D pose 234 onto 2D pixel locations of a given target image 260, matches the original skeleton image 230 generated by image encoder 208 from target image 260. MSE 412 thus helps to ensure that the projection of 3D pose 234 overlaps with the articulated object depicted in target image 260.

Perceptual loss 414 captures differences between target image 260 and rendered image 238. In some embodiments, perceptual loss 414 compares features extracted from different layers of a pretrained feature extractor. For example, perceptual loss 414 could include the following representation:

$$L_{perc\_img}=\frac{1}{N}\sum_{i=1}^{N}\|\Gamma_l(x_i)-\Gamma_l(\hat{x}_i)\|_2^2 \quad (3)$$

In the above equation, $L_{perc\_img}$ represents perceptual loss 414, $x_i$ represents a given target image 260 indexed by i in a dataset of N images, $\hat{x}_i$ represents a corresponding rendered image 238, and $\Gamma_l$ represents features extracted from an image at layer l of the feature extractor. The feature extractor could include a VGG, ResNet, Inception, MobileNet, DarkNet, AlexNet, GoogLeNet, and/or another type of deep CNN that is trained to perform image classification, object detection, and/or other tasks related to the content in a large dataset of images.

Discriminator loss 416 is used with rendered images outputted by image renderer 216 and a dataset of real images to train a second discriminator neural network. In some embodiments, the second discriminator neural network is trained to discriminate between target images of articulated objects (e.g., images inputted into image encoder 208) and "fake" images of articulated objects (e.g., rendered images outputted by image renderer 216). For example, the second discriminator neural network could be trained using the following discriminator loss 416:

$$L_{disc\_img}=\Sigma D_{img}(x_{target})^2+\Sigma(1-D_{img}(x_{render}))^2 \quad (4)$$

In the above equation, $L_{disc\_img}$ represents discriminator loss 416, $D_{img}$ represents a multi-scale discriminator for images of articulated objects, $x_{target}$ represents target images of articulated objects, and $x_{render}$ represents rendered images generated by image renderer 216. Within discriminator loss 416, $D_{img}(x_{target})$ represents the probability that the discriminator accurately predicts a target image of an articulated object, and $D_{img}(x_{render})$ represents the probability that the discriminator inaccurately classifies a rendered image as a target image. Discriminator loss 416 thus corresponds to a least squares loss that seeks to maximize the probability that the discriminator correctly identifies real images labeled with 1 and minimize the probability that the discriminator incorrectly identifies fake images labeled with 0.

In one or more embodiments, the second discriminator neural network is trained in an adversarial fashion with image renderer 216. More specifically, training engine 122 can train image renderer 216 and the second discriminator neural network in a way that minimizes perceptual loss 414 and feature matching loss 418 and maximizes discriminator loss 416. Initially, training engine 122 could train image renderer 216 in a way that minimizes perceptual loss 414 between each rendered image 238 outputted by image renderer 216 and the corresponding target image 260. Next, training engine 122 could train the second discriminator neural network in a way that maximizes discriminator loss 416 calculated from target images inputted into image encoder 208 and the corresponding rendered images outputted by the trained image encoder 208. Training engine 122 could then train both image renderer 216 and the second discriminator neural network in a way that minimizes discriminator loss 416 for image encoder 208 and maximizes discriminator loss 416 for the second discriminator neural network.

Like perceptual loss 414, feature matching loss 418 captures feature-level differences between target image 260 and rendered image 238. In one or more embodiments, feature matching loss 418 is computed using intermediate features of the second discriminator neural network. Continuing with the above example, feature matching loss 418 could include the following representation:

$$L_{disc\_img\_FM}=\frac{1}{N}\sum_{i=1}^{N}|D_l(x_i)-D_l(\hat{x}_i)| \quad (5)$$

In the above equation, $L_{disc\_img\_FM}$ represents feature matching loss 418, $x_i$ represents a given target image 260 indexed by i in a dataset of N images, $\hat{x}_i$ represents rendered image 238, and $D_l$ represents features extracted from a corresponding image at layer l of the second discriminator neural network.

As mentioned above, the first and second discriminator neural networks can include multi-scale discriminators. For example, each discriminator neural network could capture features of the corresponding input images at scales of 1, 0.5, and 0.25. As a result, values of discriminator losses 410 and 416 and feature matching loss 418 could be computed for each of the three scales. The values could also be averaged or otherwise aggregated over the three scales to produce an overall discriminator loss 410 associated with the first discriminator neural network, an overall discriminator loss 416 associated with the second discriminator neural network, and an overall feature matching loss 418 associated with the second discriminator neural network.

As mentioned above, training engine 122 trains image encoder 208, pose estimator 210, uplift model 212, and/or image renderer 216 over two stages. During the first pretraining stage, training engine 122 independently trains image encoder 208, pose estimator 210, and uplift model 212 using synthetic images 250 and synthetic poses 252 from data-generation component 202. More specifically, training engine 122 updates image encoder parameters 220 of image encoder 208 based on MSE 404 values computed between skeleton images (e.g., skeleton image 230) generated by image encoder 208 from various synthetic images 250 and the corresponding ground truth skeleton images from synthetic poses 252 for synthetic images 250. Training engine 122 also updates image encoder parameters 220 based on discriminator loss 410 values generated by the first discriminator neural network from "fake" skeleton images generated by image encoder 208 and "real" skeleton images included in unpaired poses 402. For example, training engine 122 could use gradient descent and backpropagation to update image encoder parameters 220 in a way that reduces MSE 404 and discriminator loss 410.

Training engine 122 also updates pose estimator parameters 222 of pose estimator 210 based on MSE 406 values computed between 2D poses (e.g., 2D pose 232) generated by pose estimator 210 the corresponding ground truth 2D poses in synthetic poses 252. For example, training engine 122 could use pose estimator 210 to generate 2D poses from skeleton images outputted by image encoder 208 and/or skeleton images from unpaired poses 402. Training engine 122 could also perform one or more training iterations that update pose estimator parameters 222 in a way that reduces MSE 406 between the 2D poses and the corresponding ground truth labels.

Training engine 122 additionally updates uplift model parameters 226 of uplift model 212 based on MSE 408 values computed between 3D poses (e.g., 3D pose 234) generated by uplift model 212 and the corresponding ground truth 3D poses in synthetic poses 252. For example, training engine 122 could use uplift model 212 to generate 3D poses from 2D poses outputted by pose estimator 210 and/or 2D poses in synthetic poses 252. Training engine 122 could also perform one or more training iterations that update uplift model parameters 226 in a way that reduces MSE 408 between the 3D poses and the corresponding ground truth labels.

During the first pretraining stage, training engine 122 can also train image renderer 216 based on one or more unsupervised losses 242 associated with rendered image 238. For example, training engine 122 could perform one or more training iterations that to update image renderer parameters 228 of image renderer 216 in a way that minimizes perceptual loss 414, discriminator loss 416, and/or feature matching loss 418 associated with each rendered image 238 and/or a corresponding target image 260 from synthetic images 250.

During the second training stage, training engine 122 performs end-to-end training of image encoder 208, pose estimator 210, uplift model 212, and image renderer 216 using captured images 254 from data-collection component 204 and one or more unsupervised losses 242. More specifically, training engine 122 uses image encoder 208, pose estimator 210, uplift model 212, projection module 214, and image renderer 216 to generate skeleton image 230, 2D pose 232, 3D pose 234, analytic skeleton image 236, and rendered image 238, respectively, from each target image 260 included in a set of captured images 254. Training engine 122 computes MSE 412 between skeleton image 230 and analytic skeleton image 236 and perceptual loss 414 between target image 260 and rendered image 238. Training engine 122 then uses MSE 412 to update parameters of image encoder 208, pose estimator 210, and uplift model 212. Training engine 122 also uses perceptual loss 414 to update parameters of image renderer 216, uplift model 212, pose estimator 210, and image encoder 208.

Because discriminator loss 416 involves predictions by the second discriminator neural network that is trained using synthetic data, discriminator loss 416 can cause image encoder 208, pose estimator 210, uplift model 212, and/or image renderer 216 to generate rendered images that are similar to synthetic images 250. Consequently, in some embodiments, training engine 122 omits the use of discriminator loss 416 and/or feature matching loss 418 during unsupervised end-to-end training of image encoder 208, pose estimator 210, uplift model 212, and image renderer 216. As a result, image renderer 216 is able to learn to generate rendered images that resemble captured images 254.

As mentioned above, training engine 122 also performs some supervised training of image encoder 208, pose estimator 210, and/or uplift model 212 using synthetic images 250 and synthetic poses 252 during the second training stage. For example, training engine 122 could update parameters of image encoder 208, pose estimator 210, and/or uplift model 212 based on the corresponding supervised losses 240, in lieu of or in conjunction with unsupervised training of image encoder 208, pose estimator 210, uplift model 212, and image renderer 216 using unsupervised losses 242. The unsupervised training adapts image encoder 208, pose estimator 210, uplift model 212, and image renderer 216 to the appearances of real-world articulated objects, while the additional supervised training of image encoder 208, pose estimator 210, and/or uplift model 212 during the second training stage prevents image encoder 208, pose estimator 210, and/or uplift model 212 from diverging from the pose estimation task. During the second training stage, training engine 122 could reduce one or more weights associated with supervised losses 240 to balance supervised training of image encoder 208, pose estimator 210, and/or uplift model 212 with unsupervised end-to-end training of image encoder 208, pose estimator 210, uplift model 212, and image renderer 216.

After training engine 122 has completed both training stages, training engine 122 can perform instance-specific refinement of the machine learning model for a specific object. More specifically, training engine 122 can obtain captured images 254 (e.g., one or more videos) of the object from data-collection component 204. Training engine 122 can perform one or more training iterations that update image encoder 208, pose estimator 210, uplift model 212, and image renderer 216 using the captured images 254 and one or more unsupervised losses 242. These additional training iterations fine-tune image encoder 208, pose estimator 210, uplift model 212, and/or image renderer 216 to the appearance of the object and improve the performance of image encoder 208, pose estimator 210, uplift model 212, and/or image renderer 216 in performing pose estimation for the object.

While the operation of training engine 122 has been described with respect to MSEs 404, 406, 408, and 412, discriminator losses 410 and 416, perceptual loss 414, and feature matching loss 418, those skilled in the art will appreciate that the machine learning model can be trained using other techniques and/or loss functions. For example, supervised losses 240 could include (but are not limited to) a mean absolute error, mean squared logarithmic error, cross entropy loss, and/or another measure of difference between the outputs of image encoder 208, pose estimator 210, and uplift model 212 and the corresponding labels. In another example, unsupervised losses 242 could include various discriminator losses associated with skeleton image 230, 2D pose 232, 3D pose 234, analytic skeleton image 236, and/or rendered image 238. Unsupervised losses 242 could also, or instead, include MSEs, cross entropy losses, and/or other reconstruction losses between target image 260 and rendered image 238 and/or between skeleton image 230 and analytic skeleton image 236. In a third example, various types of adversarial training techniques could be used to train image encoder 208, image renderer 216, and/or the respective discriminator neural networks. In a fourth example, projection module 214 could include one or more machine learning components that are trained independently and/or with image encoder 208, pose estimator 210, uplift model 212, and/or image renderer.

Returning to the discussion of FIG. 2, execution engine 124 uses one or more components of the trained machine learning model to perform pose estimation for images of articulated objects that are not included in the training dataset (e.g., synthetic images 250 and/or captured images 254) for the machine learning model. For example, execution engine 124 could use the component(s) of the trained machine learning model to estimate 2D and/or 3D poses in images of the same "class" or "type" of articulated objects (e.g., humans, dogs, cats, robots, mechanical assemblies, etc.) as those in the training dataset. In another example, execution engine 124 could use the component(s) to estimate 2D and/or 3D poses of a particular object, after the component(s) have been fine-tuned using captured images 254 of the object.

In some embodiments, execution engine 124 uses image encoder 208 to convert an input target image 260 into a corresponding skeleton image 230. Execution engine 124 also uses pose estimator 210 to convert skeleton image 230 into a corresponding 2D pose 232 that includes 2D pixel locations of joints or other parts of an object in target image 260. Execution engine 124 can then use uplift model 212 to convert the 2D pixel locations in 2D pose 232 into a corresponding 3D pose 234 that includes 3D coordinates of the same joints or parts. Skeleton image 230, 2D pose 232, and 3D pose 234 thus correspond to different representations of the pose of the object in target image 260.

Figure 5:
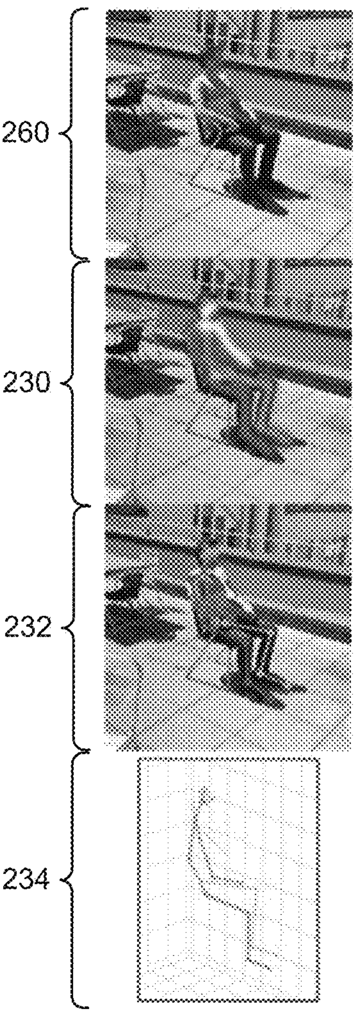
FIG. 5 illustrates an exemplar target image, skeleton image, 2D pose, and 3D pose generated by the execution engine of FIG. 1, according to various embodiments.

FIG. 5 illustrates an exemplar target image 260, skeleton image 230, 2D pose 232, and 3D pose 234 generated by execution engine 124 of FIG. 1, according to various embodiments. As shown in FIG. 5, target image 260 includes a person sitting in a chair.

Skeleton image 230 includes predicted pixel locations of the left and right sides of the head, torso, right arm, left arm, right leg, and left leg of the person in target image 260. Within skeleton image 230, a given part of the person is represented using pixel values of a different color.

2D pose 232 includes 2D pixel locations of joints in the left and right sides of the head, torso, right arm, left arm, right leg, and left leg of the person in target image 260. 3D pose 234 includes 3D coordinates of the same joints in a 3D space.

Figure 6:
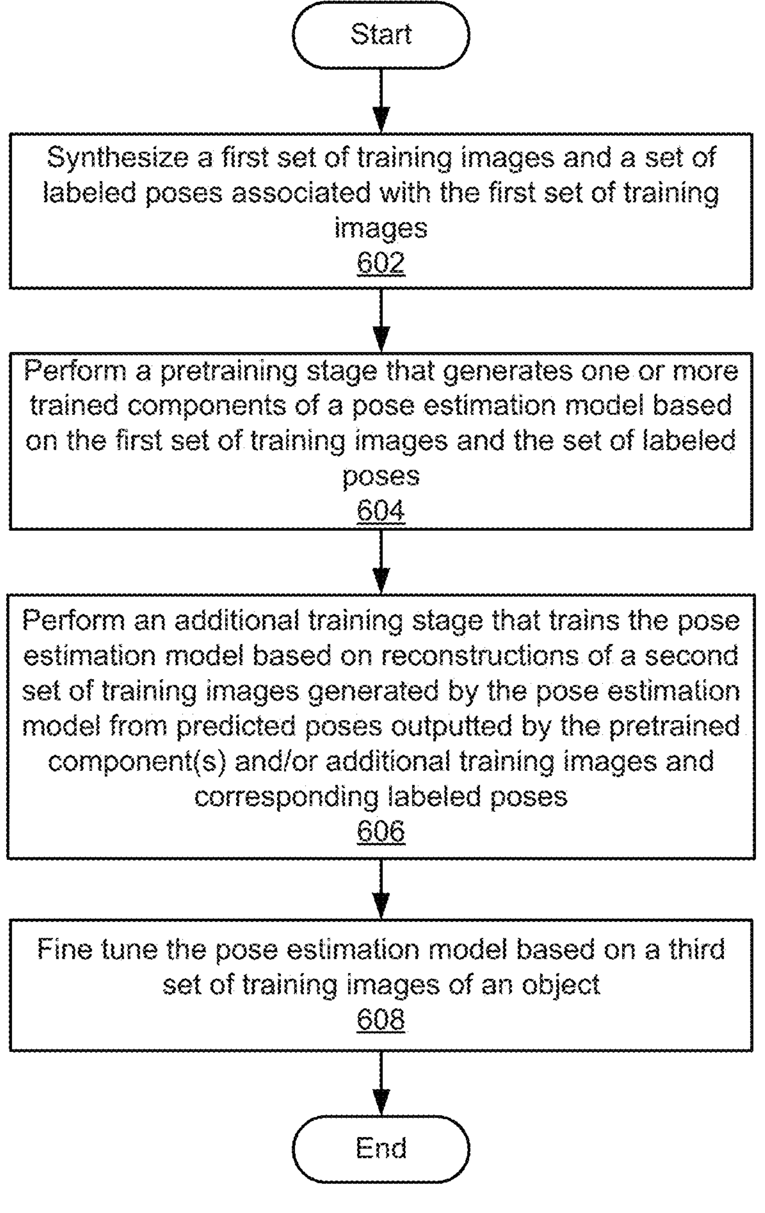
FIG. 6 is a flow diagram of method steps for generating a pose estimation model, according to various embodiments.

FIG. 6 is a flow diagram of method steps for generating a pose estimation model, according to various embodiments. Although the method steps are described in conjunction with the systems of FIGS. 1-3, persons skilled in the art will understand that any system configured to perform the method steps in any order falls within the scope of the present disclosure.

As shown, in step 602, training engine 122 synthesizes a first set of training images and a set of labeled poses associated with the first set of training images. For example, training engine 122 could use various computer graphics and/or computer vision techniques to render images of humans, animals, machinery, and/or other types of articulated objects. Within the first set of training images, the objects could vary in pose, appearance, shape, size, proportion, and background. Training engine 122 could also generate a ground truth skeleton image, 2D pose, and 3D pose for each of the rendered images. Within the skeleton image, 2D pose, and 3D pose, joints and/or limbs of an object could be separated into left and right sides of the object.

In step 604, training engine 122 performs a pretraining stage that generates one or more trained components of a pose estimation model based on the first set of training images and the set of labeled poses. For example, the pose estimation model could include an image encoder that converts an input image of an object into a skeleton image, a pose estimator that uses the skeleton image to predict 2D pixel locations of the objects joints in the input image, an uplift model that converts the 2D pixel locations into 3D coordinates, a projection module that converts the 3D coordinates into an analytic skeleton image, and/or an image renderer that generates a reconstruction of the input image based on the analytic skeleton image and a reference image of the same object. Training engine 122 could individually "pretrain" the image encoder, pose estimator, and uplift model using supervised losses between the output of each component and the corresponding ground truth. Training engine 122 could also pretrain the image encoder using a discriminator loss associated with a discriminator that distinguishes between analytic skeleton images associated with "real" poses and analytic skeleton images generated by the image encoder. Training engine 122 could further pretrain the image renderer using a perceptual loss, a discriminator loss for a discriminator that distinguishes between the training images and reconstructed images outputted by the image renderer, and/or a discriminator feature matching loss associated with intermediate features of the discriminator.

In step 606, training engine 122 performs an additional training stage that trains the pose estimation model based on reconstructions of a second set of training images generated by the pose estimation model from predicted poses outputted by the pretrained component(s) and/or additional training images and corresponding labeled poses. For example, the second set of training images could include "real-world" captured images of the same types of objects as those depicted in the first set of training images. Training engine 122 could use the image encoder, pose estimator, uplift model, and image renderer to generate skeleton images, 2D poses, 3D poses, and reconstructed images, respectively, from the captured images. Training engine 122 could also perform end-to-end unsupervised training of the image encoder, pose estimator, uplift model, and image renderer based on the perceptual loss and/or another reconstruction loss between the reconstructed images and the corresponding captured images. Training engine 122 could also, or instead, perform end-to-end unsupervised training of the image encoder, pose estimator, and uplift model based on an MSE between skeleton images generated by the image encoder from target images and analytic skeleton images generated by projecting the corresponding 3D poses onto image spaces of the target images. To prevent the pose estimation model from diverging from the pose estimation task, training engine 122 could additionally perform supervised training of the image encoder, pose estimator, and uplift model using additional training images and corresponding ground truth poses.

In step 608, training engine 122 fine tunes the pose estimation model based on a third set of training images of an object. For example, training engine 122 could perform additional unsupervised training of the pose estimation model using one or more videos of the object to adapt the pose estimation model to the appearance of the object.

After the pose estimation model is trained, execution engine 124 can use one or more components of the pose estimation model to predict poses for additional images. For example, execution engine 124 could use the image encoder to convert an input image of an object into a skeleton image. Execution engine 124 could use the pose estimator to generate a 2D pose from the skeleton image. Execution engine 124 could then use the uplift model to convert the 2D pose into a 3D pose. Execution engine 124 could further use the skeleton image, 2D pose, and/or 3D pose as one or more representations of the position and orientation of the object within the input image. The skeleton image, 2D pose, and/or 3D pose can distinguish between joints, limbs, and/or other parts on the left side of the object and joints, limbs, and/or other parts on the right side of the object.

Skeleton images, 2D poses, and/or 3D poses generated by the trained pose estimation model can additionally be used in a number of applications. For example, predicted poses outputted by the pose estimation model could be used to track the location and movement of an object, identify gestures performed by the object, generate an animation from the movement of the object, generate training data for a robot in performing a human task, and/or detect when an object has fallen over or is in ill health.

In sum, the disclosed techniques train a machine learning model to perform a pose estimation task. The machine learning model includes an image encoder that converts an input image of an object into a skeleton image, a pose estimator that uses the skeleton image to predict 2D pixel locations of the objects joints in the input image, an uplift model that converts the 2D pixel locations into 3D coordinates, a projection module that converts the 3D coordinates into an analytic skeleton image, and/or an image renderer that generates a reconstruction of the input image based on the analytic skeleton image a second different image of the same object.

During a first pretraining stage, the image encoder, pose estimator, and uplift model are individually trained in a supervised fashion using synthetic images of objects and synthetic ground truth skeleton images, 2D poses, and 3D poses of the objects within the images. Within the ground truth skeleton images, 2D poses, and 3D poses, joints, limbs, and/or other parts of the objects are separated into left and right sides to avoid ambiguities associated with poses that do not distinguish between left and right sides of objects. After the components are pretrained, a second stage of unsupervised training of the components is performed using real-world captured images of objects to allow the components to generalize to the appearances, shapes, poses, backgrounds, and other visual attributes of the objects in the real-world captured images.

One technical advantage of the disclosed techniques relative to the prior art is that components of machine learning model can be pretrained using synthetic data. Accordingly, with the disclosed techniques, a sufficiently large and diverse training dataset of images and labeled poses can be generated more efficiently than a conventional training dataset for pose estimation that includes manually selected images and manually labeled poses. Another technical advantage of the disclosed techniques is that the pretrained components are further trained using unlabeled "real world" images. The pose estimation model is thus able to generalize to new data and/or predict poses more accurately than conventional machine learning models that are trained using only synthetic data or a smaller amount of manually labeled data. These technical advantages provide one or more technological improvements over prior art approaches.

1. In some embodiments, a computer-implemented method for generating a pose estimation model comprises generating one or more trained components included in the pose estimation model based on a first set of training images and a first set of labeled poses associated with the first set of training images, wherein each labeled pose included in the first set of labeled poses comprises a first set of positions on a left side of an object and a second set of positions on a right side of the object; and training the pose estimation model based on a set of reconstructions of a second set of training images, wherein the set of reconstructions is generated by the pose estimation model from a set of predicted poses outputted by the one or more trained components.

2. The computer-implemented method of clause 1, further comprising after the pose estimation model is trained based on the set of reconstructions of the second set of training images, further training the pose estimation model based on a third set of training images of a first object.

3. The computer-implemented method of any of clauses 1-2, further comprising synthesizing the first set of training images and the first set of labeled poses prior to generating the one or more trained components.

4. The computer-implemented method of any of clauses 1-3, further comprising, after the pose estimation model is trained based on the set of reconstructions of the second set of training images, further training the pose estimation model based on a third set of training images and a second set of labeled poses associated with the third set of training images.

5. The computer-implemented method of any of clauses 1-4, further comprising applying the pose estimation model to a target image to estimate the first set of positions and the second set of positions for a first object depicted within the target image.

6. The computer-implemented method of any of clauses 1-5, wherein the one or more trained components comprise an image encoder that generates a skeleton image from an input image, and wherein the skeleton image comprises a first set of limbs associated with the first set of positions and a second set of limbs associated with the second set of positions.

7. The computer-implemented method of any of clauses 1-6, wherein the one or more trained components further comprise a pose estimator that converts the skeleton image into a first set of pixel locations associated with the first set of positions and a second set of pixel locations associated with the second set of positions.

8. The computer-implemented method of any of clauses 1-7, wherein the one or more trained components further comprise an uplift model that converts the first set of pixel locations and the second set of pixel locations into a set of three-dimensional (3D) coordinates.

9. The computer-implemented method of any of clauses 1-8, wherein the one or more trained components comprise an image renderer that generates a reconstruction of a first image of a first object based on a predicted pose associated with the first image and a second image of the first object.

10. The computer-implemented method of any of clauses 1-9, wherein the first set of positions comprises a first set of joints and the second set of positions comprises a second set of joints.

11. In some embodiments, one or more non-transitory computer-readable media store instructions that, when executed by one or more processors, cause the one or more processors to perform the steps of generating one or more trained components included in a pose estimation model based on a first set of training images and a first set of labeled poses associated with the first set of training images; and training the pose estimation model based on one or more losses associated with a second set of training images and a set of reconstructions of the second set of training images, wherein the set of reconstructions is generated by the pose estimation model from a set of predicted poses outputted by the one or more trained components.

12. The one or more non-transitory computer-readable media of clause 11, wherein the instructions further cause the one or more processors to perform the step of after the pose estimation model is trained based on the set of reconstructions of the second set of training images, further training the pose estimation model based on a third set of training images of a first object.

13. The one or more non-transitory computer-readable media of any of clauses 11-12, wherein the instructions further cause the one or more processors to perform the step of synthesizing the first set of training images and the first set of labeled poses prior to generating the one or more trained components.

14. The one or more non-transitory computer-readable media of any of clauses 11-13, wherein generating the one or more trained components comprises training an image encoder that generates a skeleton image from an input image based on an error between a set of limbs included in the skeleton image and a ground truth pose associated with the input image.

15. The one or more non-transitory computer-readable media of any of clauses 11-14, wherein training the pose estimation model comprises further training the image encoder based on a discriminator loss associated with the input image and a set of unpaired poses.

16. The one or more non-transitory computer-readable media of any of clauses 11-15, wherein generating the one or more trained components comprises training a pose estimator based on one or more errors between a predicted pose generated by the pose estimator from an input image and a ground truth pose for the input image.

17. The one or more non-transitory computer-readable media of any of clauses 11-16, wherein training the pose estimation model comprises training an image renderer based on one or more losses associated with a reconstruction of a first image of a first object generated by the image renderer, wherein the reconstruction is generated by the image renderer based on a predicted pose associated with the first image and a second input image of the first object.

18. The one or more non-transitory computer-readable media of any of clauses 11-17, wherein the one or more losses comprise at least one of a perceptual loss, a discriminator loss, or a discriminator feature matching loss.

19. The one or more non-transitory computer-readable media of any of clauses 11-18, wherein the first set of labeled poses comprises a first set of joints on a left side of an object and a second set of joints on a right side of the object.

20. In some embodiments, a system comprises one or more memories that store instructions, and one or more processors that are coupled to the one or more memories and, when executing the instructions, are configured to execute one or more trained components included in a pose estimation model based on an input image; and receive, as output of the one or more trained components, one or more poses associated with an object depicted in the input image, wherein the one or more poses comprise a first set of positions on a left side of the object and a second set of positions on a right side of the object.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a pose estimation model, the computer-implemented method comprising:

generating one or more trained components included in the pose estimation model based on one or more supervised losses computed from (i) a first set of predicted poses associated with a first set of training images and (ii) a first set of labeled poses associated with the first set of training images, wherein the first set of training images depict a first set of articulated objects against a first set of backgrounds;

generating, via execution of the one or more trained components, a set of predicted poses based on input that includes a second set of training images that depict a second set of articulated objects in a first set of poses against a second set of backgrounds;

generating, via execution of an image renderer included in the pose estimation model, a set of output images based on input that includes (i) the set of predicted poses and (ii) a set of reference images that depict the second set of articulated objects in a second set of poses against the second set of backgrounds; and training the one or more trained components and the image renderer based on one or more unsupervised losses computed between (i) the set of output images and (ii) the second set of training images to generate a trained pose estimation model.

2. The computer-implemented method of claim 1, further comprising fine tuning the trained pose estimation model based on a third set of training images of a first object and the one or more unsupervised losses.

3. The computer-implemented method of claim 1, further comprising synthesizing the first set of training images and the first set of labeled poses prior to generating the one or more trained components.

4. The computer-implemented method of claim 1, further comprising further training the trained pose estimation model based on a third set of training images and a second set of labeled poses associated with the third set of training images.

5. The computer-implemented method of claim 1, further comprising applying the pose estimation model to a target image to estimate a first set of positions on a left side of a first object depicted within the target image and a second set of positions on a right side of the first object depicted within the target image.

6. The computer-implemented method of claim 1, wherein the one or more trained components comprise an image encoder that generates a skeleton image from an input image, and wherein the skeleton image comprises a plurality of channels that indicate different sets of pixel locations for different parts of an object within the input image.

7. The computer-implemented method of claim 6, wherein the one or more trained components further comprise a pose estimator that converts the skeleton image into a first set of pixel locations associated with a first set of joint positions and a second set of pixel locations associated with a second set of joint positions.

8. The computer-implemented method of claim 7, wherein the one or more trained components further comprise an uplift model that converts the first set of pixel locations and the second set of pixel locations into a set of three-dimensional (3D) coordinates.

9. The computer-implemented method of claim 8, wherein the image renderer generates an output image included in the set of output images based on input that includes (i) a projection of the set of 3D coordinates onto pixel locations in an analytic skeleton image and (ii) a reference image included in the set of reference images.

10. The computer-implemented method of claim 1, wherein the first set of training images comprises a set of synthetic images and the second set of training images comprises a set of non-rendered images that are captured by cameras.

11. One or more non-transitory computer-readable media storing instructions that, when executed by one or more processors, cause the one or more processors to perform the steps of:

generating one or more trained components included in a pose estimation model based on one or more supervised losses computed from (i) a first set of predicted poses associated with a first set of training images that depict a first set of articulated objects against a first set of backgrounds and (ii) a first set of labeled poses associated with the first set of training images; and training the one or more trained components and an image renderer included in the pose estimation model based on one or more unsupervised losses computed between (i) a second set of training images that depict a second set of articulated objects against a second set of backgrounds and (ii) a set of reconstructions of the second set of training images to generate a trained pose estimation model, wherein the set of reconstructions is generated by the image renderer from a set of predicted poses outputted by the one or more trained components.

12. The one or more non-transitory computer-readable media of claim 11, wherein the instructions further cause the one or more processors to perform the step of fine tuning the trained pose estimation model based on a third set of training images of a first object.

13. The one or more non-transitory computer-readable media of claim 11, wherein the instructions further cause the one or more processors to perform the step of synthesizing the first set of training images and the first set of labeled poses prior to generating the one or more trained components.

14. The one or more non-transitory computer-readable media of claim 11, wherein generating the one or more trained components comprises training an image encoder that generates a skeleton image from an input image based on an error between a set of limbs included in the skeleton image and a ground truth pose associated with the input image.

15. The one or more non-transitory computer-readable media of claim 14, wherein training the pose estimation model comprises further training the image encoder based on a discriminator loss associated with the input image and a set of unpaired poses.

16. The one or more non-transitory computer-readable media of claim 11, wherein generating the one or more trained components comprises training a pose estimator based on one or more errors between a predicted pose generated by the pose estimator from an input image and a ground truth pose for the input image.

17. The one or more non-transitory computer-readable media of claim 11, wherein training the pose estimation model comprises training the image renderer based on one or more losses associated with a reconstruction of a first image of a first object generated by the image renderer, wherein the reconstruction is generated by the image renderer based on a predicted pose associated with the first image and a second input image of the first object.

18. The one or more non-transitory computer-readable media of claim 17, wherein the one or more losses comprise at least one of a perceptual loss, a discriminator loss, or a discriminator feature matching loss.

19. The one or more non-transitory computer-readable media of claim 11, wherein the first set of labeled poses comprises a first set of joints on a left side of an object and a second set of joints on a right side of the object.

20. A system, comprising:

one or more memories that store instructions, and one or more processors that are coupled to the one or more memories and, when executing the instructions, are configured to:

execute a trained pose estimation model based on an input image, wherein the trained pose estimation model is generated by:

generating one or more trained components included in a pose estimation model based on one or more supervised losses computed from (i) a first set of predicted poses associated with a first set of training images that depict a first set of articulated objects against a first set of backgrounds and (ii) a first set of labeled poses associated with the first set of training images; and training the one or more trained components and an image renderer included in the pose estimation model based on one or more unsupervised losses computed between (i) a second set of training images that depict a second set of articulated objects against a second set of backgrounds and (ii) a set of reconstructions of the second set of training images, wherein the set of reconstructions is generated by the image renderer from a set of predicted poses outputted by the one or more trained components; and receive, as output of the one or more trained components, one or more poses associated with an object depicted in the input image.

* * * * *